United States Patent [19]
Janke

[11] 3,944,841
[45] Mar. 16, 1976

[54] TWO COIL RELAY FOR DRYER WITH INTEGRATED CIRCUIT CONTROL

[75] Inventor: Donald Edward Janke, Benton Harbor, Mich.

[73] Assignee: Whirlpool Corporation, Benton Harbor, Mich.

[22] Filed: Jan. 22, 1975

[21] Appl. No.: 543,189

[52] U.S. Cl. .................................. 307/38; 34/45
[51] Int. Cl.² ........................................ H02J 4/00
[58] Field of Search ............ 307/11, 38, 39, 40, 41, 307/155, 141; 34/33, 44, 45, 55; 317/148.5 R, 148.5 B

[56] References Cited
UNITED STATES PATENTS

| | | | |
|---|---|---|---|
| 3,271,877 | 9/1966 | Guenther et al. | 307/141 X |
| 3,702,030 | 11/1972 | Janke | 34/33 |
| 3,802,091 | 4/1974 | Offutt | 34/45 |

Primary Examiner—Robert K. Schaefer
Assistant Examiner—M. Ginsburg
Attorney, Agent, or Firm—Hill, Gross, Simpson, Van Santen, Steadman, Chiara & Simpson

[57] ABSTRACT

A fabric treating appliance, such as a clothes dryer, has four different modes of machine operation which are controlled by an integrated circuit having two outputs in conjunction with a moisture sensing means and a sensor circuit; and relay circuitry is provided to interface between the integrated circuit and the power circuit of the machine. This relay circuitry includes two coils operably associated with switching apparatus so as to achieve four distinct control states corresponding to the four different modes of machine operation. A like relay circuit may be adapted for use on a machine having a three-output integrated circuit control.

29 Claims, 6 Drawing Figures

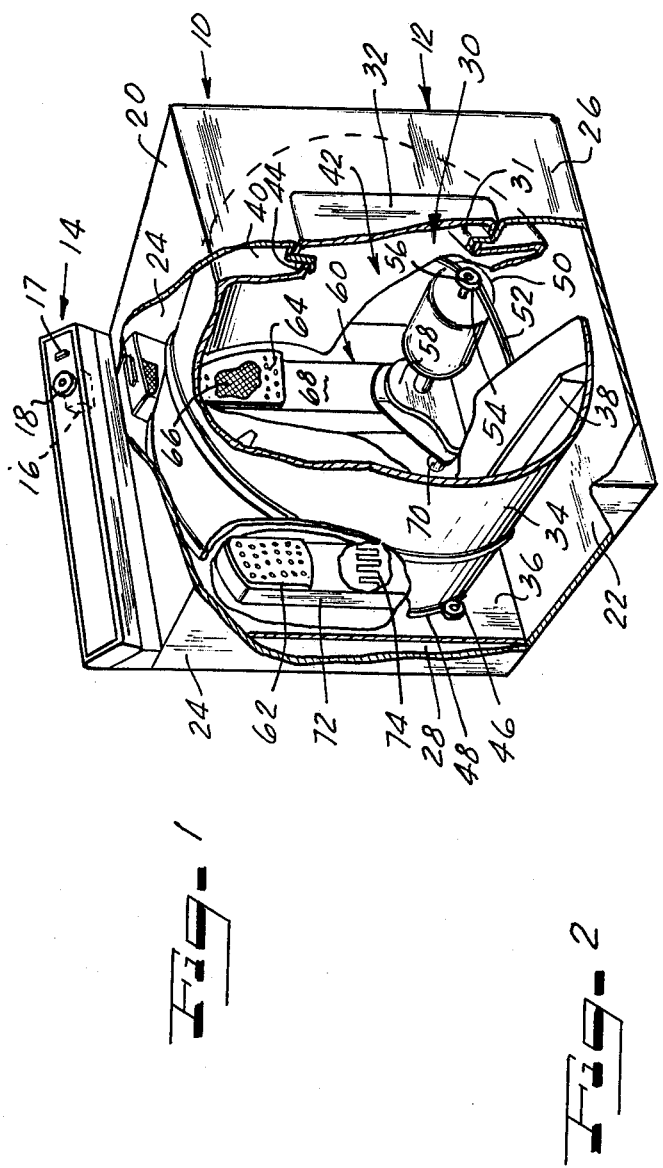

Fig-4

| DRYER FUNCTION | LOADS | | | RELAY CIRCUIT CONTACTS CLOSED | COILS ENERGIZED | | TRANSISTORS | | I.C. SIGNAL | |
|---|---|---|---|---|---|---|---|---|---|---|
| | MASTER | MOTOR | HEATER | | 120 | 122 | 116 | 118 | A | B |
| OFF | OFF | OFF | OFF | 127-128 | NO | NO | OFF | OFF | NO | NO |
| DRY | ON | ON | ON | 124-124A 126-126A 127-128 | YES | NO | ON | OFF | YES | NO |
| COOL DOWN | ON | ON | OFF | 124-124A 126-126A 127-129 | YES | YES | ON | ON | YES | YES |
| ANTI-WRINKLE | ON | OFF* | OFF | 127-129* | NO* | YES | OFF* | ON | NO* | YES |

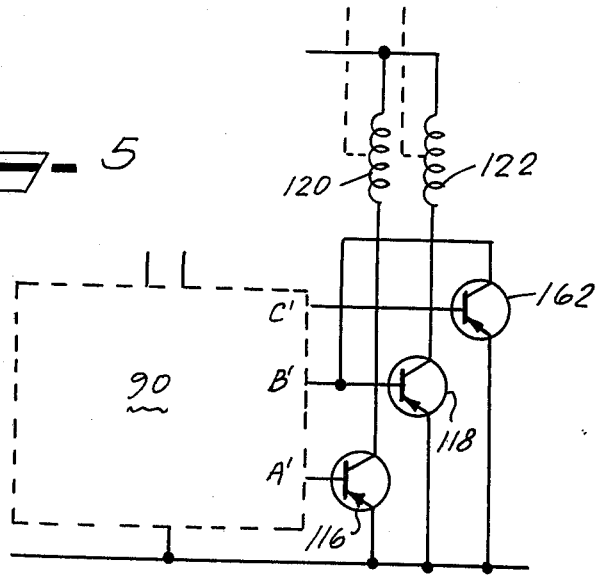

| DRYER FUNCTION | LOADS | | | RELAY CIRCUIT CONTACTS CLOSED | COILS ENERGIZED | | TRANSISTORS | | I.C. SIGNAL | | |
|---|---|---|---|---|---|---|---|---|---|---|---|
| | MASTER | MOTOR | HEATER | | 120 | 122 | 116 | 118 | A' | B' | C' |
| OFF | OFF | OFF | OFF | 127-128 | NO | NO | OFF | OFF | NO | NO | NO |
| DRY | ON | ON | ON | 124-124A 126-126A 127-128 | YES | NO | ON | OFF | YES | YES | YES |
| COOL DOWN | ON | ON | OFF | 124-124A 126-126A 127-129 | YES | YES | ON | ON | YES | YES | NO |
| ANT-WRINKLE | ON | OFF* | OFF | 127-129* | NO* | YES | OFF* | ON | NO* | YES | NO |

TWO COIL RELAY FOR DRYER WITH INTEGRATED CIRCUIT CONTROL

BACKGROUND OF THE INVENTION

1. Field of the Invention

This invention relates to the control circuitry for an appliance such as a clothes dryer, and is more particularly concerned with the relay circuit interfacing between the output terminals of an integrated circuit control and the power circuit of the machine to selectively provide distinct modes of machine operation.

2. Description of the Prior Art

Conventional appliances generally have several distinct modes of machine operation which are periodically selected and maintained through control apparatus of the machine. U.S. Pat. No. 3,271,877 issued Sept. 13,1966, and assigned to Controls Company of America shows an example of such a control apparatus which consists of control circuitry utilizing a switching configuration in conjunction with a timer.

A dryer control circuit utilizing an integrated circuit is disclosed in U.S. Pat. No. 3,702,030, Ser. No. 129,008, issued Nov. 7, 1972, and assigned to Whirlpool Corporation. This control circuit has no timer but does require interfacing circuitry between the integrated circuit output terminals and the power circuit of the dryer. An example of such interfacing circuitry where three relays are utilized to achieve four distinct modes of dryer operation is shown in U.S. Pat. Application Ser. No. 358,092, filed May 7, 1973, now U.S. Pat. No. 3,802,091 issuued on Apr. 9, 1974, and also assigned to Whirlpool Corporation.

There are a number of advantages associated with the use of an integrated circuit in the control of an appliance such as a dryer. Integrated circuits are small in size, and the integrated circuit control can be located remotely from the control knob or switch on the machine. Also, there is flexibility with regard to the controls themselves since there is no requirement for a timer dial, and controls such as pushbuttons may therefore be used.

All such integrated circuit controls, however, require circuitry to interface between the integrated circuit output terminals and the power circuit of the dryer as seen in the aforementioned U.S. Pat. No. 3,802,091. The main design criteria with regard to such interfacing circuitry is that it be efficient, reliable and durable while, at the same time, being as inexpensive as possible.

SUMMARY OF THE INVENTION

The primary object of the present invention is to provide interfacing circuitry between the integrated circuit output terminals of an appliance and the power circuit of the machine; which interfacing circuitry is efficient, reliable, and durable, while at the same time relatively inexpensive.

A second objective is to provide interfacing or relay circuitry between the integrated circuit and the power circuit of the machine, which comprises two coils utilized in conjunction with related circuitry including switching apparatus whereby four distinct modes of machine operation are achieved and whereby only one of the coils changes state during any given change in the operative mode of the machine.

Taking the example of a dryer, the integrated circuit control has two outputs, each of which is electrically connected to the base terminal of a PNP transistor. The collector terminal of each transistor is in turn electrically connected to one of two coils and the emitter terminal of each transistor is electrically connected to ground. Each transistor, when in a state of conduction caused by a signal from the integrated circuit, energizes the coil to which it is connected. Each coil is, in turn, mechanically linked to the switching apparatus, the first coil (controlled by the first integrated circuit output) being arranged to operate contacts in a double-pole normally-open switching configuration and the second coil (controlled by the second integrated circuit output) being arranged to operate a single-pole double-throw configuration of switching contacts.

A first and a second power lead are each received by the power side of the switching apparatus, and a motor lead, a heater lead, and a master control lead are each received by the load side of the switching apparatus. The first set of contacts for the double pole configuration of switching contacts controls the electrical connection of the first power lead with the motor lead, while the second set of contacts is disposed in a parallel relationship with the contacts of the single pole configuration of switching contacts and in conjunction therewith controls the electrical connection between the second power lead and the master control and heater leads respectively. The first or normal position of the single-pole double-throw configuration of contacts is with the closed contacts placing the heater lead in electrical connection with the master control lead. The master control lead is connected to the load side of the switching apparatus so that it connects electrically to the second power lead whenever the second set of double pole contacts are closed or whenever the single pole contacts are closed in their non-normal or second position.

The integrated circuit outputs each control the energization of one of the two coils which, in turn, control respectively the double pole normally open and single-pole double-throw segments of the switching apparatus, thereby selectively effecting power to the three basic loads of the dryer. When neither coil is energized, power to all loads is interrupted, and this is the "off" mode of machine operation. When the first coil is energized, power is received by all three loads defining the "dry" mode of machine operation, and when both coils are energized power is received only by the motor and the master control circuit placing the machine in the "cooldown" mode. When only the second coil is energized power goes only to the master control circuit and this condition is included in an "anti-wrinkle" mode of machine operation. Throughout the anti-wrinkle mode of machine operation, wherein the clothes load is intermittently tumbled for short periods after drying is complete in order to prevent wrinkling, the second coil will periodically be energized for a very brief time period thereby causing the motor to periodically receive power.

Since only one of the coils changes state during any given change in the operative mode of the machine, there is no need to sequence two or more nearly-simultaneous changes in coil or switch states.

The present invention can also be utilized with an integrated circuit controlled dryer having three rather than two integrated circuit outputs. A third PNP transistor is connected electrically at its base terminal to the third integrated circuit output with the collector terminal of this transistor being electrically connected to the base terminal of the transistor connected to the second integrated circuit output. This third transistor's emitter terminal is electrically connected to ground. Thus, whenever a control signal is generated from the third integrated circuit output the second coil will not be energized. Similarly, when neither the second nor the third integrated circuit output emits a control signal the second coil will be de-energized, but at all other times it will be in an energized state.

Under this arrangement, when none of the three integrated circuit outputs emits a signal, neither coil will be energized and the machine will be in the off mode. When all three emit a signal, only the first coil will be energized and this is the dry mode. When the first and second integrated circuit outputs emit a signal but the third integrated circuit output does not, both coils will be energized defining the "cooldown" mode; and when only the second integrated circuit output emits a signal, only the second coil will be energized and the machine will be in the anti-wrinkle mode. Again, throughout the anti-wrinkle mode of machine operation the motor will periodically receive power for a brief time period, in this case due to the periodic emission of a control signal from the first integrated circuit output to energize the first coil.

BRIEF DESCRIPTION OF THE DRAWING

Other objects, features and advantages of the invention, its organization, construction, and operation will be best understood from the following detailed description of an exemplary embodiment thereof taken in conjunction with the accompanying drawing, on which:

FIG. 1 pictorially illustrates a clothes dryer which may utilize the present invention, the dryer being shown with portions broken away to show internal details;

FIG. 2 is a schematic diagram of an integrated circuit control for the dryer as may apply to the apparatus of FIG. 1;

FIG. 4 is a table showing, for the circuit diagram of FIG. 3, the relationship between dryer functions and circuit states;

FIG. 5 is a partial circuit diagram showing a portion of the circuit of FIG. 3 revised so that the integrated circuit has three outputs rather than two and the relay circuit will receive the extra output.

FIG. 6 is a table showing, for the circuit diagram of FIG. 5, the relationship between dryer functions and circuit states.

DESCRIPTION OF THE PREFERRED EMBODIMENT

Figure 3:
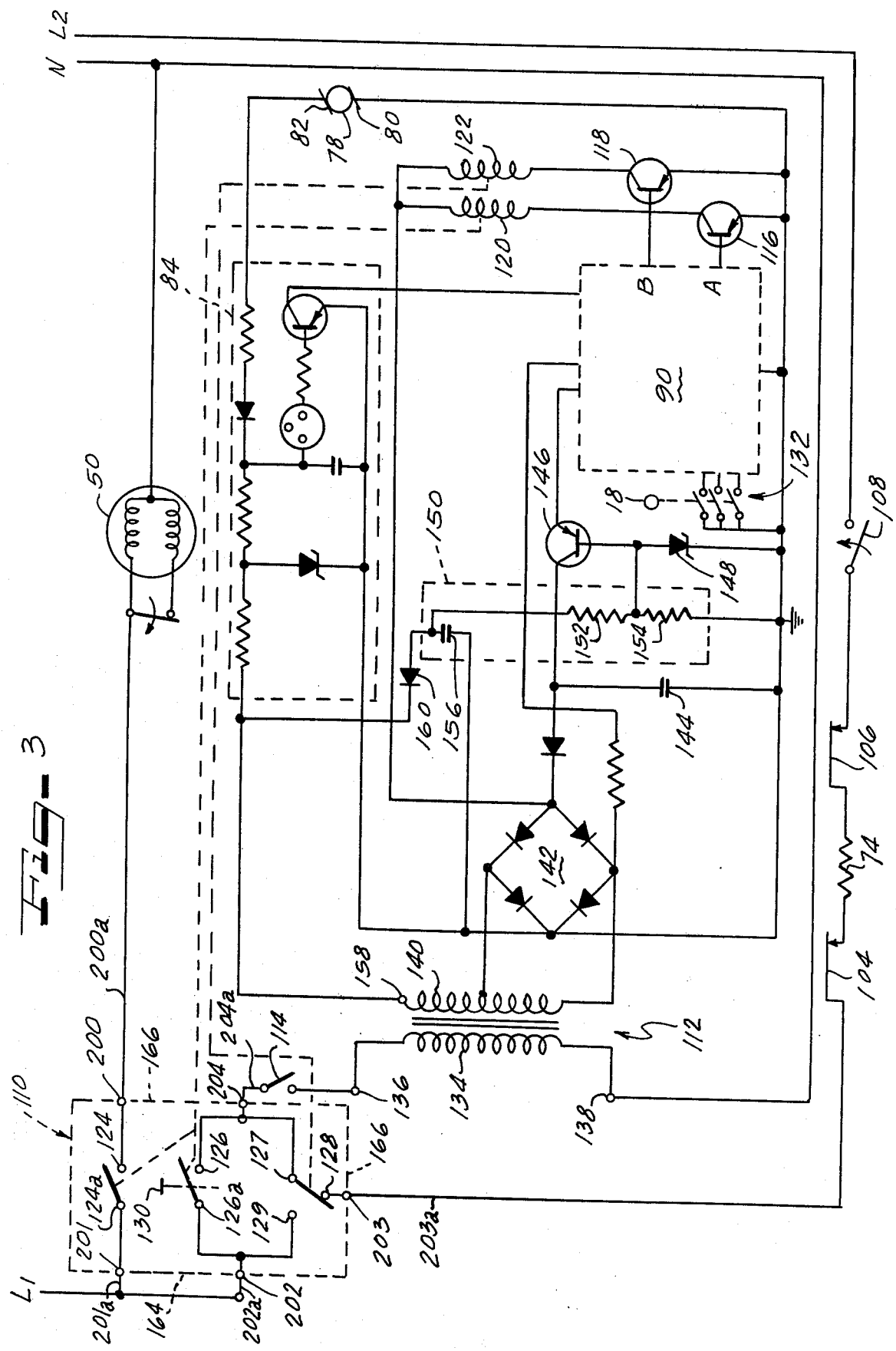
FIG. 3 is a circuit diagram for the dryer circuit represented schematically in FIG. 2 which incorporates circuitry embodying the present invention.

In the preferred embodiment of the invention, as illustrated in FIG. 1, a clothes-drying appliance or dryer 10 is shown comprising an enclosure cabinet 12 with a control console 14 thereon, housing a control device 16 for regulating the drying operation. Selector means, here shown as a control knob 18, selectively sets the control device 16 for various drying cycles of operation, as, for example, automatic or timed drying cycles. The enclosure cabinet 12 comprises a horizontal top panel 20 and a horizontal bottom panel 22, a pair of vertical side panels 24, a vertical front panel 26, and a vertical rear panel 28. An access opening 30 is provided in the front panel 26, and is defined by an axially in-turned flange 31, having a closure door 32 cooperating therewith to facilitate loading and unloading of the dryer 10.

The dryer 10 further includes a drying container for tumbling clothes in the form of a rotatable drum 34 housed within the cabinet 12 and extending axially from the front panel 26 to a bulkhead 36 spaced forwardly of the rear panel 28. To encourage tumbling action in the clothing being dried, a plurality of circumferentially-spaced baffles 38 (only one being illustrated) are mounted on the inner surface of the drum 34. The drum 34 includes a radially inwardly extending front closure wall 40 having an opening 42 therein formed by means of an axially out-turned flange 44. The out-turned flange 44 provides a forwardly-extending bearing annulus which overlies and is suitably journalled on the in-turned flange 31 of the cabinet 12. It will be apparent from the foregoing that the opening 42 into the drum 34 and the access opening 30 formed in the front panel 26 are concentric and provide access into the rotatable drum 34 from outside the cabinet 12 when the door 32 is open. The drum 34 is supported at the rear by a pair of support rollers 46 (only one being illustrated) mounted on the bulkhead 36. A raceway or circumferential groove 48 indented into the peripheral wall of the rear portion of the drum 34 serves as a track for the rollers 46.

A motor 50, mounted to the bottom panel 22 in a rear corner of the cabinet 12, rotatably drives the drum 34 by means of a drive belt 52 extending around the periphery of, and in frictional engagement with, the drum 34 and around the motor pulley 54 which is mounted at one end of a motor shaft 56. The other end of the motor shaft 56 drives a blower 58, arranged to circulate air through the drum 34. The blower 58 is included in a warm air system 60 positioned between the rear panel 28 and the bulkhead 36.

The bulkhead 36 serves to enclose the open ended rear portion of the drum 34 and provides a fixed rear wall in which to locate a pair of spaced openings comprising an air inlet 62 and an air outlet 64. The blower 58 draws moisture laden air from the interior of the drum 34 through the outlet 64, through a removable lint screen 66 and an air duct 68 and forces it through an exhaust duct 70. Air exhausted from the drum 34 is replaced by ambient air which enters the warm air system 60 by way of an intake opening (not shown) in the rear panel 28 and is drawn through a fresh air duct 72, passing over a heater means 74 and into the drum 34 through the inlet 62. The warm air system 60 thus circulates a stream of warm air through the drum 34, subjecting clothing placed therein to a drying environment to remove moisture from the fabrics while the clothing is tumbled as the drum rotates.

Referring now to FIG. 2, the drum 34 is schematically illustrated as being driven by the motor 50 via the belt 52 and the motor pulley 54. A portion of the warm air system is also schematically illustrated and is shown as comprising heater means 74, air inlet 62, and air outlet 64. The broken arcuate arrow 76 indicates the direction of air flow.

Attached to the bulkhead 36 and exposed to the drum 34 is a moisture sensing means 78 which comprises a pair of sensor electrodes, including a first sensor electrode 80 and a second sensor electrode 82, which are bridged by the moist tumbling fabric as the clothing is being dried. The first sensor electrode 80 is connected to ground and the second sensor electrode 82 is connected to a sensor circuit 84 of an integrated circuit control 86, such as described in the aforementioned U.S. Pat. No. 3,702,030. The sensor circuit 84 operates to provide repetitive reset signals to a counter circuit 88 of an integrated circuit 90; and as the moisture content of the clothes decreases, the frequency of these reset signals increases.

As set forth in the aforementioned U.S. Pat. No. 3,702,030, the counter circuit 88 comprises two separate counter sections which are operated by pulses derived from a conventional line current input. The first of these counter sections is repetitively reset by signals from the sensing circuit 84 and is in turn employed to provide a reset signal for the second counter section. Therefore, when the frequency of signals from the sensing circuit 84 increases to the point where the first counter section is repetitively reset before it can generate its reset signal to the second counter section, the second counter section will reach its predetermined count and operate to signal termination of the drying cycle. This termination signal is received by a control logic circuit 92 which, in conjunction with a drying program stored in a memory circuit 94, provides output control signals for the dryer through a relay circuit means 96.

The relay circuit means 96 provides four distinct output states which are inputs to a power circuit 98 which, in consequence of the input state indicated, selectively provides power through respective load leads 210, 212 and 214 to three distinct power loads namely the motor 50, the heater means 74, and a master control circuit 100 comprised of a power transformer circuit 102, the integrated circuit control 86, and the moisture sensing means 78. The control knob 18 shown in FIG. 1 operates switches which cooperate with the control logic circuit 92 and the memory circuit 94 to select or alter a drying program, and the control device 16 also shown in FIG. 1 may be considered to include all the integrated circuit controls hereinbefore described.

Turning now to FIG. 3, a circuit diagram for the dryer shown schematically in FIG. 2 is shown. The dryer is connected to a power source or supply, for example a three-wire 230 volt commercial supply, at terminals L1, L2 and N. With such a commercial supply, a 230 volt potential is provided across terminals L1–L2, and a 115 volt potential is provided across terminals L1–N. The circuit is divided such that one portion of its components is generally associated with 115 volt operation from terminals L1–N and another portion of its components is associated with the 230 volt operation provided by way of terminals L1–L2.

More specifically, the portion of the circuit associated with terminals L1–L2 comprises the heater means 74 connected electrically in series with thermostat means including an operating thermostat 104 for selectively controlling the temperature level in the drum and a safety thermostat 106 for shutting down the machine when the temperature in the drum exceeds a predetermined value; switch means, in this case a centrifugal switch 108 operated by the motor 50 at a predetermined speed; and switching apparatus 110 of the relay circuit means 96 (also shown schematically in FIG. 2). Thus, switching apparatus 110 controls power to the heater means but the heater means may be energized by terminals L1–L2 only when the motor has reached a predetermined speed closing centrifugal switch 108.

The circuit associated with terminals L1–N includes a motor 50 electrically connected in series with switching apparatus 110, and a power transformer 112 electrically connected in series with a normally closed door switch 114 and also with switching apparatus 110. The transformer 112 is a part of and supplies power to the master control circuit 100 which comprises sensor circuit 84, moisture sensing means 78, integrated circuit 90, and circuitry for energizing said integrated circuit as hereinafter described. A detailed explanation of the sensor circuit may be had by reference to the aforementioned U.S. Pat. No. 3,702,030.

The integrated circuit 90 provides output control signals A and B to the relay circuit means 96 comprised of a first PNP transistor 116, a second PNP transistor 118, relay coils 120 and 122, and switching apparatus 110. The base of transistor 116 is electrically connected to one of the integrated circuit outputs for receiving output signal A, and the base of transistor 118 is electrically connected to the other integrated circuit output for receiving output signal B. The collector of transistor 116 is electrically connected to coil 120, while the collector of transistor 118 is electrically connected to coil 122. The emitter of each transistor is electrically connected to ground. Signals A and B thus control the conduction of transistors 116 and 118 selectively, causing, in turn, the energization of respective relay coils 120 and 122. Relay coils 120 and 122 control the operation of contacts 124, 124A, 126, 126A, 127, 128 and 129 of switching apparatus 110. As a result, output signals A and B, through relay circuit 96, control the energization of the motor 50, the heater means 74, and the master control circuit 100. Initializing means are also provided within the master control circuit and operated by control knob 18 to isure that the integrated circuit 90, including the counter circuit 88 thereof, will be reset whenever power to the integrated circuit is interrupted. Such a power interruption would occur, for instance, when the dryer door 32, and hence the door switch 114, is opened during the operation of the machine; and but for the initializing means the integrated circuit would be free to assume a random state.

In operation, manual closure of contacts 126–126A through manual start means, here shown as a push-to-start switch 130 illustrated by the pushbutton 17 on the console 14, energizes the master control circuit and hence the integrated circuit 90 to provide the appropriate output signals to cause selective energization of the motor and the heater means and to maintain energization of the master control circuit. The dryer is thus operated through a drying program under the control of the integrated circuit 90 as determined by selector means, here shown as a selector switch 132 in association with control knob 18.

The energization of integrated circuit 90 from a transformer 112 is accomplished in the manner as follows. The power transformer 112 has a primary winding 134 which is connectable to the 115 volt supply at the terminals 136 and 138, and a secondary winding 140. To this secondary winding is connected a full wave bridge rectifier 142 which supplies direct current to a filter capacitor 144, an emitter follower voltage regulator including a regulator transistor 146 and a Zener reference diode 148, and the DC shutdown circuitry indicated at 150 including a resistor 152, a resistor 154, and a capacitor 156.

The AC voltage applied to the primary winding 134 of the transformer 112 from terminals L1-N is transformed to approximately 30 volts, rectified by the full wave bridge rectifier 142 and filtered by the capacitor 144. Simultaneously, approximately 115 volts becomes available at the upper terminal 158 of the secondary winding 140, is half wave rectified by a diode 160 and is then fed to the capacitor 156 as a half wave charging current. The charge on the capacitor 156 is then coupled to the base of the regulator transistor 146 through the voltage divider network including the resistor 152 and the resistor 154. When at least 90 volts is applied to the primary winding 134 of the transformer 112, sufficient current is delivered to the base of the regulator transistor 146 to turn on the transistor and maintain the Zener reference diode 148 in conduction. This provides a regulated source of smooth DC from the capacitor 144 to the integrated circuit 90. The values of the resistors 152 and 154 and the capacitor 156 are selected so that the RC time constant of the circuit supplying base current to the transistor 146 is very short. As a result, when an interruption in the AC supply voltage occurs, the charge on the capacitor 156 is quickly exhausted and the current provided to the base of the transistor 146 is insufficient to maintain the transistor in conduction. The voltage on the base of the transistor falls to zero quickly, the transistor turns off and the direct current from the capacitor 144 is isolated from the integrated circuit 90.

After removal of the DC voltage from the integrated circuit 90 and upon a reapplication of DC voltage the initializing means resets the circuit. The value of the capacitor 144 is very large, for example 150 microfarads, in comparison to the capacitor 156 which may be, for example, 0.33 microfarads, and there is no bleed resistor connected across the capacitor 144. Consequently, when the regulating transistor 146 is turned off, charge can be stored on the capacitor 144 for very long periods of time. This guarantees the availability of a smooth DC voltage for application to the integrated circuit 90 during periods when it is subjected to a rapid succession of re-starts.

Having described the operation and control of the dryer as it relates to the present invention I will now specifically describe the invention itself.

The integrated circuit 90 selectively emits two control signals heretofore designated A and B respectively. Control signal A is received from a first integrated circuit output by transistor 116 as hereinbefore described and causes said transistor to assume a state of conduction, thereby energizing the coil 120. Similarly, control signal B is received from a second integrated circuit output by transistor 118 which, in turn, energizes coil 122. Coils 120 and 122 are functionally associated, as for example by a mechanical linkage, with the switching apparatus 110.

The switching apparatus 110 has poles and contacts arranged in the configuration of a double pole normally open switch including contacts 124, 124A, 126 and 126A, and a single pole double throw switch including contacts 127, 128, and 129. The normal state for the contacts in the single pole configuration is with contacts 127–128 closed, this being the "normal" or "first closed position" as opposed to the "second closed position" where contacts 127–129 are closed.

The switching apparatus 110 also has a power side 164 and a load side 166 as seen in FIG. 3. A first power lead 210A is received by the power side 164 of the switching apparatus 110 at a terminal 201 which connects electrically to contact 124A, and a second power lead 202A is received by the power side at a terminal 202 which connects electrically to contacts 129 and 126A. The motor lead 200A connects with a terminal 200 on the load side 166 of the switching apparatus 110, and the terminal 200 is electrically connected to contact 124. Similarly, a heater lead 203A is received by the load side 166 of the switching apparatus at a terminal 203 which connects electrically to contact 128; and a master control lead 204A is received by the load side of the switching apparatus at a terminal 204 which connects electrically to contacts 126 and 127. It will be seen from FIG. 3 that the contacts in the double pole normally open configuration are controlled by coil 120 and that the contacts of the single pole throw configuration are controlled by coil 122. Thus, when only coil 120 is energized contacts 124–124A, 126–126A, and 127–128 are closed; and when only coil 122 is energized only contacts 127–129 are closed. When neither coil is energized only contacts 127–128 are closed; and when both coils are energized contacts 124–124A, 126–126A, and 127–129 are closed.

It will also be seen from FIG. 3 that the first pair of contacts in the double pole normally open configuration control the electrical connection between the first power lead 201A and the motor lead 200A; and that the second pair of said contacts are disposed in a parallel relationship with the contacts to of the single pole double throw configuration to control, in conjunction therewith, the electrical connection between the second power lead 202A and the heater and master control leads respectively. Consequently, when both coils are de-energized the double pole contacts 124A–124 and 126A–126 will be open and single pole contacts 127–128 will be closed leaving all circuits open with no power reaching the motor, the heater means, or the master control circuit. When coil 120 is energized and coil 122 is not the double pole contacts 124A–124 and 126A–126 are closed and single pole contacts 127–128 remain closed in the normal or first closed position allowing power to reach all three loads. When both coils are energized the double pole contacts remain closed but the single pole contacts are in the second closed position with contacts 127–129 closed rather than contacts 127–128. Power is then received by the master control circuit and by the motor, but not by the heater means. When coil 120 is de-energized with coil 122 energized the double pole contacts are open and the single pole contacts are in the second closed position with contacts 127–129 closed. At this time only the master control circuit receives power.

It is apparent, therefore, that the relay circuit 96 herein disclosed allows four distinct states to be achieved in the dryer circuit from only two integrated circuit outputs. These four states will, of course, correspond to four distinct modes of machine operation for the dryer 10, for instance Off, Dry, Cooldown, and Anti-Wrinkle cycle. It should be noted that the Anti-Wrinkle mode of dryer operation includes periodic, relatively short, time intervals during which the relay circuit provides a state in the dryer's circuit equivalent to the state during the Cooldown mode of machine operation. The table of FIG. 4 summarizes the foregoing in terms of the relationship between integrated circuit control signal outputs and dryer function.

From FIG. 5 and the table of FIG. 6 it will be seen that the invention can also be used in a dryer having a three-output integrated circuit where the three integrated circuit outputs are designated A′, B′, and C′ and correspond in operative state to the motor, the master control circuit, and the heater means respectively. This is accomplished by the addition of a transistor 162 to the relay circuit 96. The base terminal of the transistor 162 is electrically connected to the third integrated circuit output to receive the control signal C′. The collector terminal of the transistor 162 is electrically connected to the base terminal of transistor 118 and the emitter terminal of transistor 162 is electrically connected to ground. When the control signal C′ is received by transistor 162 the transistor 162 assumes a state of conduction and establishes an electrical path of low resistance to ground. The control signal B′ will thus be grounded through transistor 162 whenever transistor 162 is in a state of conduction. Consequently, the absence of control signals A′, B′, and C′ will result in neither coil being energized; control signals A′, B′, and C′ will together energize coil 120 but not coil 122; control signals A′ and B′ without control signal C′ will energize both coils; and control signal B′ alone will energize coil 122 but not coil 120. The result is a relationship between dryer function and integrated circuit outputs as seen in the table of FIG. 6 which corresponds to the relationships previously discussed and shown in FIG. 4.

It will be noted that by utilizing two coils to achieve the four distinct modes of dryer operation in the manner disclosed herein, only one of the two coils changes its state at any one time to achieve a given change in the operative mode of the dryer. The sequence of changes in coil states related to the sequence of different machine operations may be seen in the table of FIG. 4. The sequence is energize coil 120, energize coil 122, de-energize coil 120, de-energize coil 122.

In devices where, for instance, more than one coil changes state at one time to achieve a change in dryer mode there is normally a problem caused by the fact that the changes in coil states, and therefore in switching operations, do not occur simultaneously, notwithstanding the fact that the difference in timing may be very slight. During the period in which the coils are changing state, the state of the dryer is uncertain, especially since there will be a random pattern with regard to which coil first becomes energized. For this reason most such devices require sequencing means to insure a predetermined sequence to the changes in coil state during a change in dryer mode. This adds to the complexity of the machine and to the cost thereof.

From the foregoing it is apparent that the objects of the invention have been completely fulfilled and that the relay circuit employing only two coils will interface between the master control circuit and the power circuit of a dryer to provide four distinct operative states and hence four distinct dryer functions.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

The embodiments of the invention in which an exclusive property or privilege is claimed are defined as follows:

1. In a clothes drying machine having different modes of machine operation, means for selectively obtaining the operative mode desired, said means comprising:
   a power circuit for connection to a power source,
   power loads selectively energized by the power circuit for effecting operation of the machine, said power loads including a motor, heater means, and a master control circuit, said master control circuit having an integrated circuit with a first and a second output for emitting control signals, and
   relay circuit means interfacing between the power circuit and the master control circuit and responsive only to the control signals from the first and the second integrated circuit outputs for controlling selective energization of the power loads to provide four distinct modes of machine operation.

2. The clothes drying machine as claimed in claim 1 wherein the relay circuit means includes manual starting means for establishing electrical connection between the power circuit and the master control circuit to power said master control circuit.

3. The clothes drying machine as claimed in claim 1 wherein the relay circuit means comprises:
   a first and a second coil electrically connected to the first and the second integrated circuit outputs respectively, and
   switching apparatus operably associated with the first and the second coils for controlling power to the three power loads.

4. The clothes drying machine as claimed in claim 2 wherein the manual starting means is a push-to-start switch.

5. The clothes drying machine as claimed in claim 3 wherein the power circuit includes a first power lead, a second power lead, a motor lead electrically connected to the motor, a heater lead electrically connected to the heater means, and a master control lead electrically connected to the master control circuit, and wherein the switching apparatus comprises:
   a power side and a load side, said power side receiving the first and the second power leads, and said load side receiving the motor lead, the heater lead, and the master control lead,
   a first set of contacts arranged in a double pole normally open switching configuration, said first set of contacts having a first pair and a second pair of contacts, and each of said pairs of contacts having a first contact on the power side of the switching apparatus and a second contact on the load side of the switching apparatus,
   a second set of contacts arranged in a single pole double throw configuration and having a first contact, a second contact, and a third contact, and said single pole contacts further having a first closed position placing said first and said second single pole contacts in electrical communication and a second closed position placing said first and said third single pole contacts in electrical communication,
   said first power lead electrically connected to the first contact of the first pair of double pole switching contacts, and the motor lead electrically connected to the second contact of the first pair of double pole switching contacts,
   said second pair of double pole switching contacts connected in a parallel relationship with the contacts of the single pole switching configuration, and said first and said third single pole contacts connected on the load side of the switching apparatus and said second single pole contact connected on the power side of said switching apparatus, said second power lead electrically connected to the first contact of the second pair of double pole switching contacts and to the second contact of the single pole configuration of switching contacts, said master control lead electrically connected to the second contact of the second pair of double pole switching contacts and to the first contact of the single pole configuration of switching contacts, and said heater lead electrically connected to the third contact of the single pole configuration of switching contacts, whereby the motor receives power whenever the first pair of contacts of the double pole configuration are closed, the master control circuit receives power whenever the second pair of contacts of the double pole configuration are closed and also whenever the single pole configuration of switching contacts is in the first closed position, and the heater means receives power whenever the single pole configuration of switching contacts is in the second closed position and the second pair of contacts of the double pole configuration of switching contacts are closed.

6. The clothes drying machine as claimed in claim 5 wherein the first and the second coils are operably associated with the double pole normally open configuration of switching contacts and the single pole double throw configuration of switching contacts respectively.

7. The clothes drying machine as claimed in claim 6 wherein the master control circuit includes:
   a sensor circuit for providing signals to the integrated circuit which effect the control signals of the integrated circuit outputs,
   moisture sensing means for selectively emitting signals in response to the moisture content of the clothes, which signals are received by the sensor circuit, and
   a transformer circuit for transmitting power to the sensor circuit and the moisture sensing means.

8. The clothes drying machine as claimed in claim 7 wherein the machine has a drum for tumbling clothes and wherein the moisture sensing means comprises:
   a first and a second sensor electrode located in proximity to the clothes in the drum,
   said first sensor electrode being electrically connected to ground, and
   said second sensor electrode being electrically connected to the sensor circuit,
   whereby the clothes being tumbled in the drum are, at random intervals, bridged across said first and said second sensor electrodes to permit electrical conduction between said electrodes in direct proportion to the moisture content of said clothes.

9. A control for an appliance having different operative modes of operation and a first, a second and a third power load for effecting said different operative modes; said control comprising:
   a power circuit for connection to a power source, said power circuit including a first, a second and a third load lead, for electrical connection respectively to the first, the second, and the third power loads;
   a master control circuit electrically connected to the second load lead, said master control circuit including an integrated circuit with a first and a second output for emitting control signals; and
   relay circuit means interfacing between the power circuit and the master control circuit for providing four distinct modes of appliance operation in response only to the control signals from the first and the second integrated circuit outputs.

10. The control as claimed in claim 9 wherein the relay circuit means includes manual starting means for establishing electrical connection between the power circuit and the master control circuit to power said master control circuit.

11. The control as claimed in claim 10 wherein the relay circuit means comprises:
   a first and a second coil electrically connected to the first and the second integrated circuit outputs respectively, and
   switching apparatus operably associated with the first and the second coils for controlling power to the three power loads.

12. The control as claimed in claim 11 wherein the power circuit includes a first and a second power lead, and wherein the switching apparatus comprises:
   a power side and a load side, said power side receiving the first and the second power leads, and said load side receiving the first, the second, and the third load leads;
   a first set of contacts arranged in a double pole normally open switching configuration, said first set of contacts having a first pair and a second pair of contacts, and each of said pairs of contacts having a first contact on the power side of the switching apparatus and a second contact on the load side of the switching apparatus;
   a second set of contacts arranged in a single pole double throw configuration and having a first contact, a second contact, and a third contact, and said contacts further having a first closed position placing said first and second single pole contacts in electrical communication and a second closed position placing said first and said third single pole contacts in electrical communication;
   said first power lead electrically connected to the first contact of the first pair of double pole switching contacts, and the first load lead electrically connected to the second contact of the first pair of double pole switching contacts;
   said second pair of double pole switching contacts connected in a parallel relationship with the contacts of the single pole switching configuration, and said single pole contacts connected with said first and said third single pole contacts on the load side of the switching apparatus and said second single pole contact on the power side of said switching apparatus;
   said second power lead electrically connected to the first contact of the second pair of double pole switching contacts and to the second contact of the single pole configuration of switching contacts;
   said second load lead electrically connected to the second contact of the second pair of double pole switching contacts and to the first contact of the single pole configuration of switching contacts; and
   said third load lead electrically connected to the third contact of the single pole configuration of switching contacts;
   whereby the first load receives power whenever the first pair of contacts of the double pole configuration are closed, the second load receives power whenever the second pair of contacts of the double pole configuration are closed and also whenever the single pole configuration of switching contacts is in the first closed position, and the third load receives power whenever the single pole configuration of switching contacts is in the second closed position and the second pair of contacts of the double pole configuration of switching contacts are closed.

13. The control as claimed in claim 12 wherein the first and the second coils are operably associated with the double pole normally open configuration of switching contacts and the single pole double throw configuration of switching contacts respectively.

14. The control as claimed in claim 13 wherein the master control circuit includes:
a sensor circuit for providing signals to the integrated circuit which effect the control signals of the integrated circuit outputs, and
sensing means for selectively emitting signals in response to an external stimulus, which signals are received by the sensor circuit.

15. The control as claimed in claim 14 wherein the appliance is a clothes dryer, and wherein the sensing means are moisture sensing means responsive to the moisture content of the clothes.

16. The control as claimed in claim 15 wherein the clothes dryer has a drum for tumbling clothes and wherein the moisture sensing means comprises:
a first and a second sensor electrode located in proximity to the clothes in the drum,
said first sensor electrode being electrically connected to the ground, and
said second sensor electrode being electrically connected to the sensor circuit,
whereby the clothes being tumbled in the drum are, at random intervals, bridged across said first and said second sensor electrodes to permit electrical conduction between said electrodes in inverse proportion to the moisture content of said clothes.

17. A device for controlling an appliance having different operative modes of appliance operation and a first, a second, and a third power load for effecting said different operative modes, said device comprising:
a power circuit for connection to a power source, said power circuit including a first, a second, and a third load lead, for electrical connection respectively to the first, the second, and the third power loads;
a master control circuit electrically connected to the second load lead, said master control circuit including an integrated circuit with a first, a second, and a third output for emitting control signals; and
relay circuit means interfacing between the power circuit and the master control circuit and including a first and a second coil responsive to the control signals from the first, the second and the third integrated circuit outputs for selectively controlling the power circuit to provide four distinct modes of appliance operation by employing only the two coils.

18. The device as claimed in claim 17 wherein the relay circuit means includes manual starting means for establishing electrical connection between the power circuit and the master control circuit to power said master control circuit.

19. The device as claimed in claim 17 wherein the first integrated circuit output is electrically connected to the first coil and the second and third integrated circuit outputs are electrically connected to the second coil, and wherein said relay circuit means includes switching apparatus operably associated with the first and the second coils for controlling power to the three power loads.

20. The device as claimed in claim 19 wherein the relay circuit means includes a first, a second, and a third transistor,
said first transistor electrically connected in series relationship between the first integrated circuit output and the first coil,
said second transistor electrically connected in series relationship between the second integrated circuit output and the second coil, and
said third transistor electrically connected to the third integrated circuit output and to the second transistor such that whenever said third transistor is in a state of conduction said second transistor cannot be in a state of conduction.

21. The device as claimed in claim 19 wherein the relay circuit means includes a first, a second, and a third PNP transistor, each of said transistors having a base terminal, a collector terminal, and an emitter terminal;
said first PNP transistor having its base terminal electrically connected to the first integrated circuit output, its collector terminal electrically connected to the first coil, and its emitter terminal electrically connected to ground;
said second PNP transistor having its base terminal electrically connected to the second integrated circuit output, its collector terminal electrically connected to the second coil, and its emitter terminal electrically connected to ground; and
said third PNP transistor having its base terminal electrically connected to the third integrated circuit output, its collector terminal electrically connected to the base terminal of the second PNP transistor, and its emitter terminal electrically connected to ground.

22. The device as claimed in claim 21 wherein the power circuit includes a first and a second power lead, and wherein the switching apparatus comprises:
a power side and a load side, said power side receiving the first and the second power leads, and said load side receiving the first, the second, and the third load leads;
a first set of contacts arranged in a double pole normally open switching configuration, said first set of contacts having a first pair and a second pair of contacts, and each of said pairs of contacts having a first contact on power side of the switching apparatus and a second contact on the load side of the switching apparatus;
a second set of contacts arranged in a single pole double throw configuration and having a first contact, a second contact, and a third contact, and said second set of contacts further having a first closed position placing said first and said second single pole contacts in electrical communication and a second closed position placing said first and said third single pole contacts in electrical communication;
said first power lead electrically connected to the first contact of the first pair of double pole switching contacts, and the first load lead electrically connected to the second contact of the first pair of double pole switching contacts;

said second pair of double pole switching contacts connected in a parallel relationship with the contacts of the single pole switching configuration, and said single pole contacts having said first and said third single pole contacts on the load side of the switching apparatus and said second single pole contact on the power side of said switching apparatus;

said second power lead electrically connected to the first contact of the second pair of double pole switching contacts and to the second contact of the single pole configuration of switching contacts;

said second load lead electrically connected to the second contact of the second pair of double pole switching contacts and to the first contact of the single pole configuration of switching contacts;

said third load lead electrically connected to the third contact of the single pole configuration of switching contacts;

whereby the first load receives power whenever the first pair of contacts of the double pole configuration are closed, the second load receives power whenever the second pair of contacts of the double pole configuration are closed and also whenever the single pole configuration of switching contacts is in the first closed position, and the third load receives power whenever the single pole configuration of switching contacts is in the second closed position and the second pair of contacts of the double pole configuration of switching contacts are closed.

23. The device as in claim 22 wherein the first and the second coils are operably associated with the double pole normally open configuration of switching contacts and the single pole double throw configuration of switching contacts respectively.

24. The device as in claim 23 wherein the master control circuit includes:
a sensor circuit for providing signals to the integrated circuit which effect the control signals of the integrated circuit outputs, and
sensing means for selectively emitting signals in response to an external stimulus, which signals are received by the sensor circuit.

25. The control as in claim 24 wherein the appliance is a clothes dryer, and wherein the sensing means are moisture sensing means responsive to the moisture content of the clothes.

26. The device as in claim 25 wherein the clothes dryer has a drum for tumbling clothes and wherein the moisture sensing means comprises:
a first and a second sensor electrode located in proximity to the clothes in the drum,
said first sensor electrode being electrically connected to ground, and
said second sensor electrode being electrically connected to the sensor circuit,
whereby the clothes being tumbled in the drum are, at random intervals, bridged across said first and said second sensor electrodes to permit electrical conduction between said electrodes in inverse proportion to the moisture content of said clothes.

27. In a clothes drying machine having different modes of machine operation, means for selectively obtaining the desired operative mode, said means comprising:
a power circuit for connection to a power source;
power loads energized by said power circuit to effect operation of the machine;
one of said power loads including a master control circuit operable in accordance with the drying program to provide a sequence of combinations of two control signals representing operative modes;
interface means for connecting said power circuit to said power loads, said interface means including relay means having a plurality of interconnected contacts connected between said power circuit and said power loads and operated in unique combinations in response to corresponding combinations of only said two control signals to provide four distinct modes of machine operation.

28. In a clothes drying machine according to claim 27, wherein said relay means comprises a first relay coil and a second relay coil and said plurality of interconnected contacts comprises a set of double throw contacts operated by said first relay coil and including a first fixed contact connected to said power circuit, a second fixed contact connected to a first of said power loads, and a movable contact, and first and second sets of single throw contacts operated by said second relay coil, said first set of single throw contacts including a first contact connected to said power circuit and a second contact connected to a second of said power loads, said second set of single throw contacts including a first contact connected to said power circuit and a second contact connected to said movable contact for connecting said power circuit to said first power load upon the combined closure of said movable and second fixed contacts and said second set of single throw contacts.

29. In a clothes drying machine of the type wherein a plurality of power loads, including a master control circuit which operates to provide a sequence of unique combinations of output signals, are selectively connected to a power circuit via an interface in accordance with a drying program, the improvement wherein:
the master control circuit includes two outputs and operates to provide a sequence of combinations of only two output signals; and
the interface comprises first and second sets of interconnected contacts connected between the power loads and the power circuit, and a pair of relay coils connected to respective ones of said outputs and operatively coupled to respective ones of said first and second sets of interconnected contacts, said relay coils operable to provide operation of the power loads in accordance with the drying program.

* * * * *